US008325085B2

(12) United States Patent
Darlington

(10) Patent No.: US 8,325,085 B2
(45) Date of Patent: Dec. 4, 2012

(54) WEATHER RADAR SIGNAL PROCESSING

(75) Inventor: Timothy Darlington, Exeter (GB)

(73) Assignee: The Secretary of State for Defence (GB)

( * ) Notice: Subject to any disclaimer, the term of this patent is extended or adjusted under 35 U.S.C. 154(b) by 586 days.

(21) Appl. No.: 12/515,803

(22) PCT Filed: Nov. 30, 2007

(86) PCT No.: PCT/GB2007/004608
§ 371 (c)(1),
(2), (4) Date: Aug. 3, 2009

(87) PCT Pub. No.: WO2008/065425
PCT Pub. Date: Jun. 5, 2008

(65) Prior Publication Data
US 2010/0052976 A1    Mar. 4, 2010

(30) Foreign Application Priority Data
Nov. 30, 2006    (GB) .................................. 0623959.4

(51) Int. Cl.
G01S 13/95    (2006.01)
G01S 13/00    (2006.01)
(52) U.S. Cl. .................... 342/199; 342/26 R; 342/83
(58) Field of Classification Search .................... 342/199
See application file for complete search history.

(56) References Cited

U.S. PATENT DOCUMENTS

| 4,040,055 A | 8/1977 | Donahue |
| 4,095,224 A | 6/1978 | Dounce et al. |
| 4,626,856 A | 12/1986 | Pierson et al. |
| 4,635,060 A * | 1/1987 | Mertens .................. 342/194 |
| 4,809,004 A | 2/1989 | Brandaeo et al. |
| 5,053,777 A * | 10/1991 | Peyrat .................... 342/173 |
| 6,697,011 B2 * | 2/2004 | Yabugaki ................. 342/82 |

FOREIGN PATENT DOCUMENTS

EP    0337567    10/1989

OTHER PUBLICATIONS

Fritz et al. "Retrieval of Surface-layer Refractivity using the CSU-CHILL Radar." IEEE International Conference on Geoscience and Remote Sensing Symposium, Jul. 21-Aug. 4, 2006. pp. 1914-1917.*
F. Fabry, et al., "Extraction of near-surface index of refraction using radar phase measurements from ground targets," Antennas and Propagation Society International Symposium, pp. 2625 and 2527, 1997.
F. Fabry, "Meteorological Value of Ground Target Measurements by Radar," Journal of Atmospheric and Oceanic Technology, vol. 21, pp. 560-573, Apr. 2004.

* cited by examiner

Primary Examiner — John M Sotomayor
Assistant Examiner — Matthew M Barker
(74) Attorney, Agent, or Firm — Dean W. Russell; Kilpatrick Townsend & Stockton LLP

(57) ABSTRACT

A method and system are described whereby a magnetron-based radar transmission signal is accurately measured, allowing for measurement of absolute phase change returns from fixed clutter targets caused by changes in the refractive index of the transmission medium.

4 Claims, 2 Drawing Sheets

WEATHER RADAR SIGNAL PROCESSING

CROSS REFERENCE TO RELATED APPLICATIONS

This application is the U.S. national phase of International Application No. PCT/GB2007/004608 filed on Nov. 30, 2007 and published in English on Jun. 5, 2008 as International Publication No. WO 2008/065425 A1, which application claims priority to Great Britain Patent Application No. 0623959.4 filed on Nov. 30, 2006, the contents of which are incorporated herein by reference.

FILED OF THE INVENTION

The present invention relates to the processing of weather radar signals, more particularly where the radar system is magnetron based.

BACKGROUND OF THE INVENTION

Where a radar system (1) sits in a site where there is a known set of static 'clutter' targets (2) (FIG. 1) and is sending out a transmission signal (3), the phase of the return signal (4) from the static clutter targets should, all else being equal, be a constant. In practice, return signal readings vary in that there are changes in phase of the radar signal from the clutter targets. This variation is due to changes in the refractive index of the atmosphere through which the signal travels, which itself is dependent on temperature, pressure and humidity. The changes due to temperature and pressure are minor in comparison with the changes due to humidity, which means that if the phase return from known static clutter can be measured, it is possible to make a measurement of the humidity of the atmosphere. This measurement of humidity is of great interest in and can be used to improve weather measurement and prediction.

As is known in the art, weather radar typically has a frequency range in the GHz range. A magnetron based radar is preferable in terms of cost relative to other radar types, however magnetron based radars suffer from frequency variation such that whereas the production of a transmission signal of a particular frequency is intended, the actual signal produced commonly varies from this due to frequency changes caused by changes in the size of the magnetron cavity due to thermal expansion.

A GHz signal is at too high a frequency to process, so to overcome this it is standard practice to transfer or down convert the return signal to a lower frequency by mixing with a signal at a different frequency slightly below that of the transmitted signal. This mixing signal is generated using a Stable Local Oscillator (STALO). The resulting signal, which is typically in the MHz range, is known in the art as the Intermediate Frequency (IF).

Typically, a magnetron radar may have a base frequency of 5.625 GHz, which is mixed with a STALO signal at 5.595 GHz to produce an IF signal of 30 MHz. The base frequency, however, may vary from the 5.625 GHz by ±500 KHz due to the magnetron frequency variation.

Further, as well as slight variations in the transmitter signal, the STALO signal is also subject to minor variation. These combined variations in transmitter signal and STALO mixing signal mean that the IF is generally not sufficiently stable enough to provide the sensitivity to pick up the changes in phase of the radar signal which would be attributable to atmospheric humidity.

SUMMARY OF THE INVENTION

Accordingly, the invention provides a magnetron based radar system (1) having a GHz transmission signal (3) and comprising the following steps:

Mixing the transmission and return (4) GHz signals with a GHz signal created by a digital high-stability STALO (5) to create IF signals (6, 7) in the MHz range;

Digitising the IF signals using fast analogue to digital converters (8);

Taking samples (9) of the transmitter IF signal and feeding these samples into a high accuracy frequency estimation algorithm (10) which, given the known demand to the STALO, can calculate the actual transmitter frequency, being the sum of the STALO frequency demanded and the frequency of the transmitter burst IF;

Keeping the IF signals at a constant frequency by iterative digital control changes to the STALO signal using the output from the high accuracy frequency estimation algorithm (11);

Further downconverting the IF signals to baseband by use of a numerical oscillator (12), wherein the mixing signals (13, 14) are at the exact IF frequency of the transmitter signal (6), as calculated from the high accuracy frequency estimation algorithm (10), in order to precisely downconvert to baseband (15, 16);

Calculating the phase values (17) of the return signal from static targets using the baseband signal;

Over time using the phase values and the accurately known transmitter frequencies to accurately calculate phase changes and hence calculate changes in the refractive index of the transmission medium.

DETAILED DESCRIPTION

Figure 1:
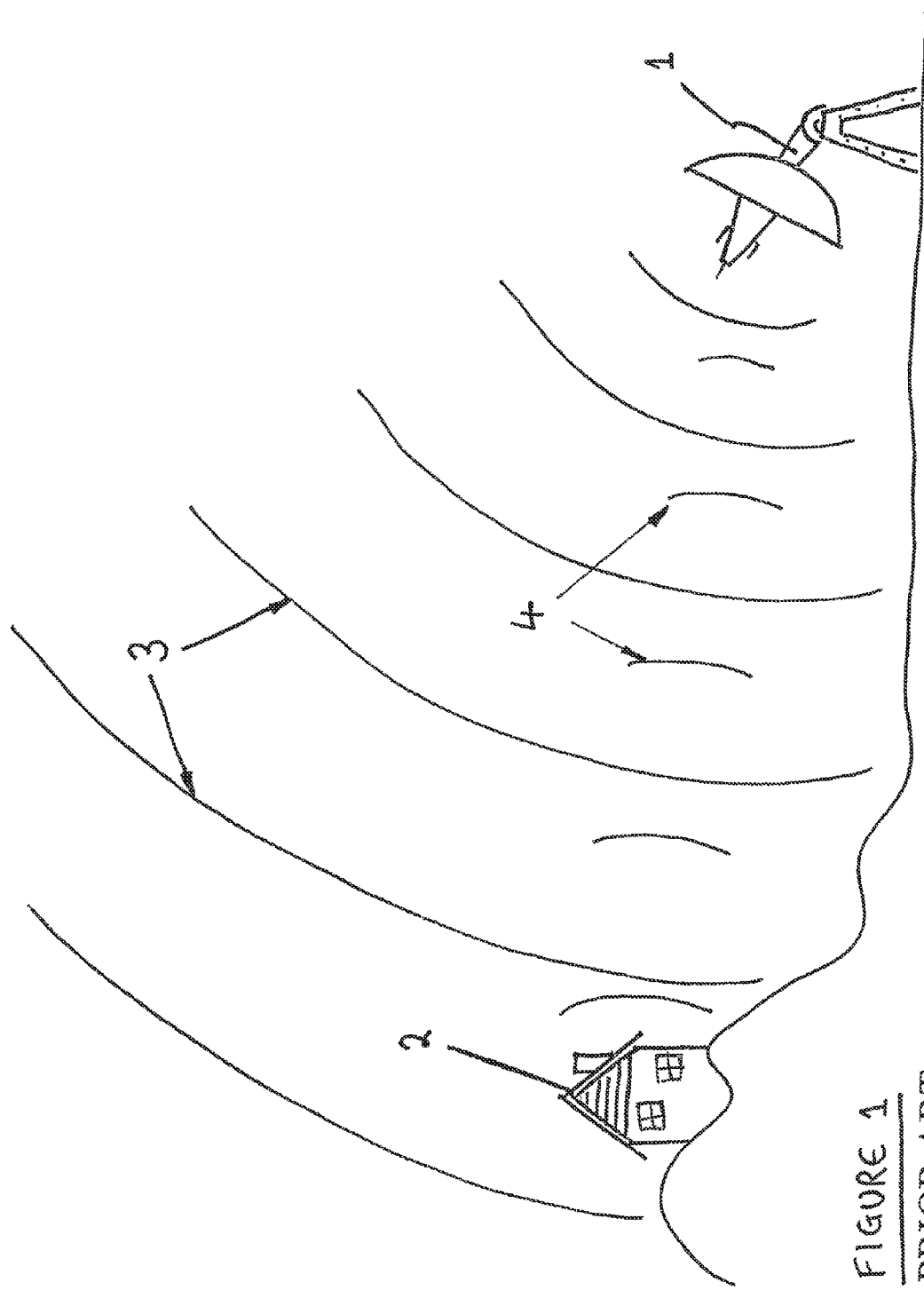
FIG. 1 is a schematized depiction of an operating radar system.

The invention has the advantage that it enables accurate measurement of the transmitter frequency of the magnetron based radar, thus allowing changes in phase of the returned transmitted signal from fixed clutter objects at different times to be accurately measured and attributed to the refractivity and hence humidity of the atmosphere, which is the transmission medium in the case of weather radar.

Available fast analogue to digital converters have a sample frequency range capable of sampling and digitally processing signals in the range of the typical IF in this application. Once in the digital domain the signal is further downconverted by using multiplication by sine and cosine values generated by a device commonly known in the art as a Numerical Oscillator. This converts the IF signal to baseband, where phase variations associated with refractive index changes can be measured. Because in the digital domain the values used for downconversion are simply calculated sine and cosine values, they can be at any frequency below the maximum or Nyquist frequency of the digital system. They can be generated to a level of precision limited by the number of bits used and the accuracy of the oscillator used to clock the digital device. This, when used with a digital frequency demand to the STALO, where the invention allows the exact transmitter frequency to be known and informs this digital frequency demand, enables the precise downconversion required for the desired measurement.

It is necessary to specify that the STALO has high frequency stability, at least greater than 1 ppm. This is possible by using a high stability frequency source in the STALO or by locking the STALO to an external high stability source such as a GPS locked reference oscillator. With this in place any frequency variation can be attributed to the magnetron and corrected for in the digital downconversion and subsequent data processing.

In this way, rather than controlling the transmitter frequency absolutely (which is impossible in a magnetron radar due to frequency changes caused by changes in the size of the magnetron cavity due to thermal expansion), it is possible by use of a fast analogue to digital converter to capture the IF signals. By taking samples of the transmitted signals at the IF, and with the known digitally requested STALO frequency, transmitter frequency can be accurately calculated. Along with this, full digital control of the STALO and the Numerical Oscillator enable absolute control of the downconversion frequency. This allows the adverse effects of magnetron frequency drift to be negated, and isolation of refractivity effects on the radar signal to be achieved, thus allowing humidity to be measured.

Samples of the transmitted and received IF signals may be digitised using two analogue to digital converters, one for the transmission IF and one for the received signal IF, or advantageously a switch (18), such as an RF switch, may be used to alternately select whether samples are taken from the transmitted pulse or the received signal, which nominally occur in turn, to be converted to IF, reducing the requirement for a second analogue to digital converter. Typically, a transmission signal may be 'fired' for 2 microseconds, and the return signal received over a period of $\frac{1}{300}^{th}$ of a second or 3.33 milliseconds before the transmitter fires again.

Figure 2:
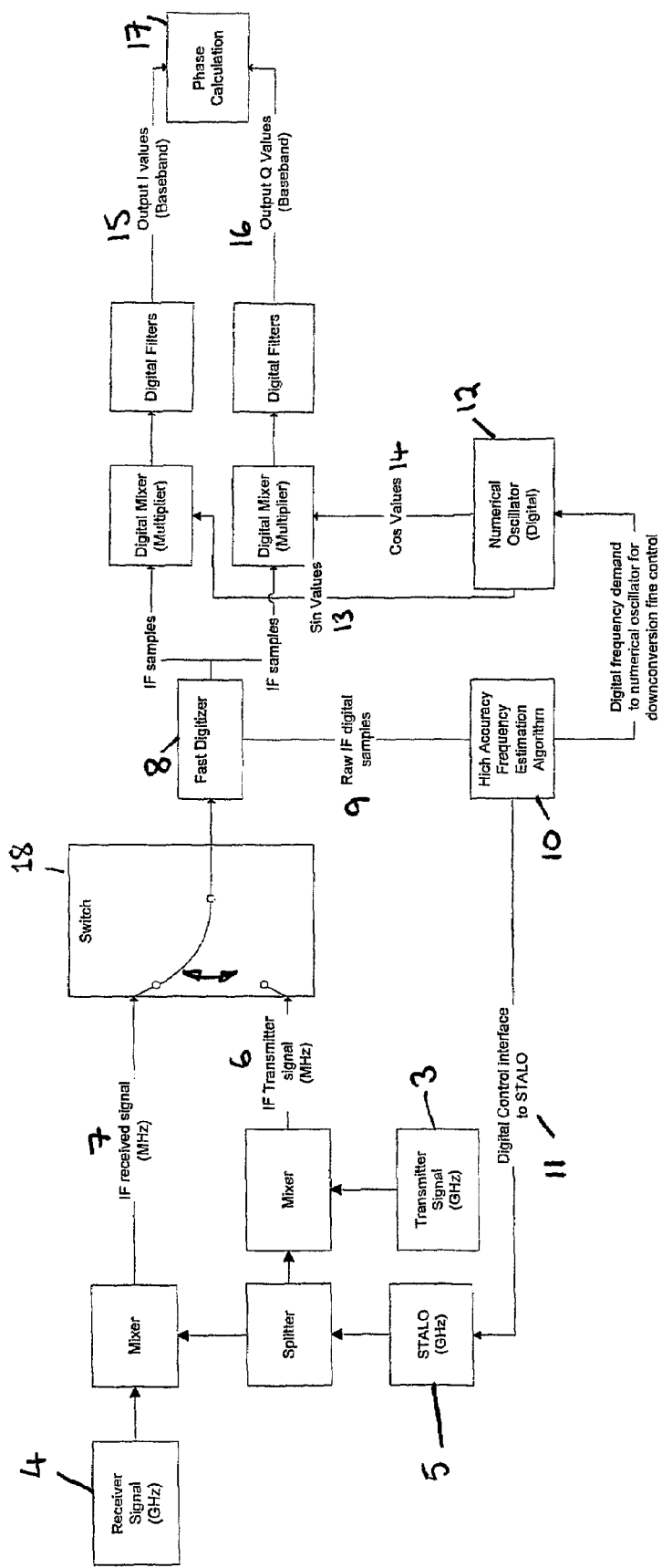
FIG. 2 is a block diagram illustrating an exemplary radar system of the present invention.

FIG. 2 gives an example illustration of a radar system according to the invention.

What is claimed is:

1. A method of operating a magnetron based radar system having a gigahertz (GHz) transmission signal, comprising:
   mixing the transmission and return GHz signals with a GHz signal created by a digital high-stability stable local oscillator (STALO) to create intermediate frequency (IF) signals in the megahertz (MHz) range;
   digitising the IF signals using one or more fast analogue to digital converters;
   taking samples of the transmitter IF signal and feeding these samples into a high accuracy frequency estimation algorithm which, given the known demand to the STALO, calculates the actual transmitter frequency, being the sum of the STALO frequency demanded and the frequency of the transmitter burst IF;
   keeping both transmitted and received IF signals at a constant frequency by iterative digital control changes to the STALO signal using the output from the high accuracy frequency estimation algorithm;
   further downconverting the transmitted and received IF signals to baseband by use of a numerical oscillator to provide mixing signals, wherein the mixing signals are at the exact IF frequency of the transmitter signal, as calculated from the high accuracy frequency estimation algorithm, in order to precisely downconvert to baseband;
   calculating the phase values of the return signal from static targets using the baseband signal;
   over time, using the phase values and the accurately known transmitter frequencies to accurately calculate phase changes and hence calculate changes in the refractive index of the transmission medium.

2. A method of operating a magnetron based radar system as claimed in claim 1 wherein a switch is used to allow a single fast analogue to digital converter to digitise both the transmission and return IF signals.

3. A method of operating a magnetron based radar system as claimed in claim 2 wherein the switch is a radio frequency (RF) switch.

4. A method of operating a magnetron based radar system as claimed in claim 1 to provide data from which to determine humidity of air, wherein phase measurements of reflections from static targets enable changes in the refractive index of the transmission medium to be measured to provide the data.

* * * * *